United States Patent
Pichler et al.

(10) Patent No.: US 6,511,529 B1
(45) Date of Patent: Jan. 28, 2003

(54) METHOD OF REDUCING THE NUMBER OF POLLUTANTS IN A GAS FLOW AND DEVICE FOR CARRYING OUT SAID METHOD

(75) Inventors: Karin Pichler, Linz (AT); Günter Schrey, Linz (AT); Alfred Hirsch, deceased, late of Linz (AT), by Beate Hirsch, legal representative

(73) Assignee: Voest-Alpine Industrieanlagenbau GmbH (AT)

(*) Notice: Subject to any disclaimer, the term of this patent is extended or adjusted under 35 U.S.C. 154(b) by 0 days.

(21) Appl. No.: 09/180,805

(22) PCT Filed: Apr. 28, 1997

(86) PCT No.: PCT/AT97/00081

§ 371 (c)(1), (2), (4) Date: Jan. 4, 1999

(87) PCT Pub. No.: WO97/43029

PCT Pub. Date: Nov. 20, 1997

(30) Foreign Application Priority Data

May 15, 1996 (AT) .................................................. 857/96

(51) Int. Cl.$^7$ .................................................. B01D 47/06
(52) U.S. Cl. ........................... 95/197; 95/199; 95/205; 95/224; 96/239; 96/265; 96/322
(58) Field of Search ........................ 95/195, 197, 199, 95/205, 224, 223; 96/236, 265, 239, FOR 118, FOR 130, 322

(56) References Cited

U.S. PATENT DOCUMENTS

| | | | | |
|---|---|---|---|---|
| 2,242,294 A | * | 5/1941 | Fox et al. ........................ | 95/195 |
| 3,073,092 A | * | 1/1963 | Ancrum et al. ................. | 95/205 |
| 3,701,237 A | | 10/1972 | Smuck | |
| 3,733,788 A | | 5/1973 | Crowley | |
| 3,923,478 A | * | 12/1975 | Fiedler et al. ................. | 95/205 |
| 3,932,149 A | * | 1/1976 | Melkerson ..................... | 95/205 |
| 4,478,802 A | * | 10/1984 | Honkaniemi et al. .......... | 95/195 |
| 5,041,274 A | * | 8/1991 | Kagi Sr. ........................ | 95/199 |

FOREIGN PATENT DOCUMENTS

| | | |
|---|---|---|
| DE | 3034539 | 9/1980 |
| DE | 4032288 | 10/1990 |
| EP | 0210435 | 8/1991 |

OTHER PUBLICATIONS

F. Tödt, *Korrosion und Korrosionsschutz* (corrosion and corrosion prevention), publisher: Walter de Gruyter, Berlin, 1955, p. 204.

Robert H. Perry, Don W. Green, *Perry's Chemical Engineers' Handbook*, McGraw–Hill, New York, Chapter 9, pp. 40–41.

* cited by examiner

Primary Examiner—Duane S. Smith
(74) Attorney, Agent, or Firm—Ostrolenk, Faber, Gerb & Soffen, LLP

(57) ABSTRACT

The object of the invention is to provide a method of treating wash water resulting from the scrubbing of process gases in smelting plants, according to which method the wash water is brought into intimate contact with the process gas and is circulated when the solids have been deposited. The method according to the invention draws off a partial flow from the wash water, mixes it with fresh water and uses it for rewashing the process gas. According to the invention, the wash water necessary for the scrubbers is drawn from a wash water container. In the sedimentation tank the insoluble portions are removed from the substance-charged wash water which is then introduced into the wash water container. The wash water required for the rewashing stage is removed from the wash water container and mixed with fresh water via the fresh water pipe. Solids are likewise removed in the sedimentation tank from the wash water from the rewashing stage, this wash water then being, circulated after introduction into the wash water container.

10 Claims, 2 Drawing Sheets

METHOD OF REDUCING THE NUMBER OF POLLUTANTS IN A GAS FLOW AND DEVICE FOR CARRYING OUT SAID METHOD

BACKGROUND OF THE INVENTION

The invention relates to a process for the treatment of wash water during the scrubbing of process gases from metallurgical processes, wherein the wash water is brought into close contact with the process gas and recirculated after the solids have been separated.

A process for the direct production of hot metal from lumpy iron ore is known from DE-PS 30 34 539, wherein the iron ore is reduced to sponge iron in a direct-reduction shaft furnace by means of a reduction gas and then melted in a melter gasifier by means of coal and oxygenous gas, with the generator gas used for iron-ore reduction being generated simultaneously. The generator gas is cooled and dedusted, and a partial flow thereof is injected into the reduction zone of the direct-reduction shaft furnace, where it is converted and drawn off as top gas.

EP-PS 0 210 435 describes an arrangement for scrubbing gases from an iron-ore reduction plant, where the cooling and purifying units consist of a packed scrubber. In a Venturi scrubber with a connected demister, the process gas is stripped and scrubbed; in this process, a residual dust content of approx. 5 mg/Nm$^3$ is achieved.

According to "F. Tödt; Korrosion und Korrosionsschutz (corrosion and corrosion prevention)" publisher, Walter de Gruyter, Berlin, 1955, page 204, generator gases must have a high degree of purity, particularly as to their total amount of alkali since these alkali compounds cause corrosion on gas turbines.

According to "R. H. Perry, D. Green; Chemical Engineers Handbook", McGraw-Hill, N.Y., ch. 9, pp. 40–41 top gases from metallurgical processes can be used as generator gas for the generation of electric energy in a gas turbine. The residual heat content of the combustion gas exiting the gas turbine can be further used for steam generation.

A process for cleaning wash water from gas scrubbers of iron-ore reduction plants is known from DE-OS 40 32 288, wherein after close contact with the process gas, the solids are separated from the wash water and the wash water is recirculated after cooling.

In this process as well as in most other circulation processes, water-soluble compounds, particularly alkali and alkaline-earth compounds, naturally accumulate in the wash water.

SUMMARY OF THE INVENTION

Accordingly, the technical problem of the invention is to create a process and an arrangement which prevent alkali and alkaline-earth compounds from accumulating without increasing the circulating water volume, without additional waste-water freight to be treated and without major structural modifications to the plant.

According to the invention, the technical problem is solved by drawing off a partial flow of the wash water, by mixing it with fresh water and by using it for secondary scrubbing of the process gas.

This invention allows for the first time to bring the process gas, which has already been prepurified and liberated from the major part of those constituents that can be washed out, into close contact with a wash water of a minimum total salt content because fresh water is admixed to the partial flow of the wash water of the last scrubber stage.

According to a special feature of the invention, fresh water is admixed to the partial flow of wash water in a mixing ratio of 2:1 to 4:1, preferably approx. 3:1. Within these mixing ratios, the required low total salt content can be observed without increasing the circulating water volume because only the water volume preferably lost by evaporation is replaced.

According to an embodiment of the invention for implementing the process, the arrangement is comprised of several scrubbing stages for the process gas, a settling basin for separating the washed-out solids, a wash-water basin for the circulated wash water and a wash-water conveying line.

According to an embodiment of the invention, an additional conveying line is provided for a partial flow of the wash water between the wash-water basin and preferably the last scrubbing stage of the gas scrubber, into which a fresh-water supply line leads.

This arrangement allows to minimize the salt freight of the process gas by increasing the solution potential preferably of this last scrubber stage because wash water with a high share of fresh water is fed.

According to a special embodiment of the invention, a flow controller is provided in the fresh-water supply line, by means of which the amount of the circulating wash water can be controlled and the variable fresh-water requirements of the wash-water cycle can be taken into account.

According to another embodiment of the invention, a fresh-water supply line leads into the wash-water storage tank and a conveying line is located between the second chamber and preferably the last scrubbing stage of the gas scrubber. This allows to observe the planned total wash-water volume in the wash-water cycle without expensive control. This also ensures that the wash water of the last scrubber stage has a minimum salt freight and, thus, a high solution potential.

According to another embodiment, a flow controller is provided in the fresh-water supply line. Owing to this embodiment, the variable fresh-water requirements of the scrubber stages can be taken into account.

DESCRIPTION OF THE DRAWING FIGURE

The invention is explained in greater detail by means of the embodiments represented in the drawings.

DESCRIPTION OF A PREFERRED EMBODIMENT

Figure 1:
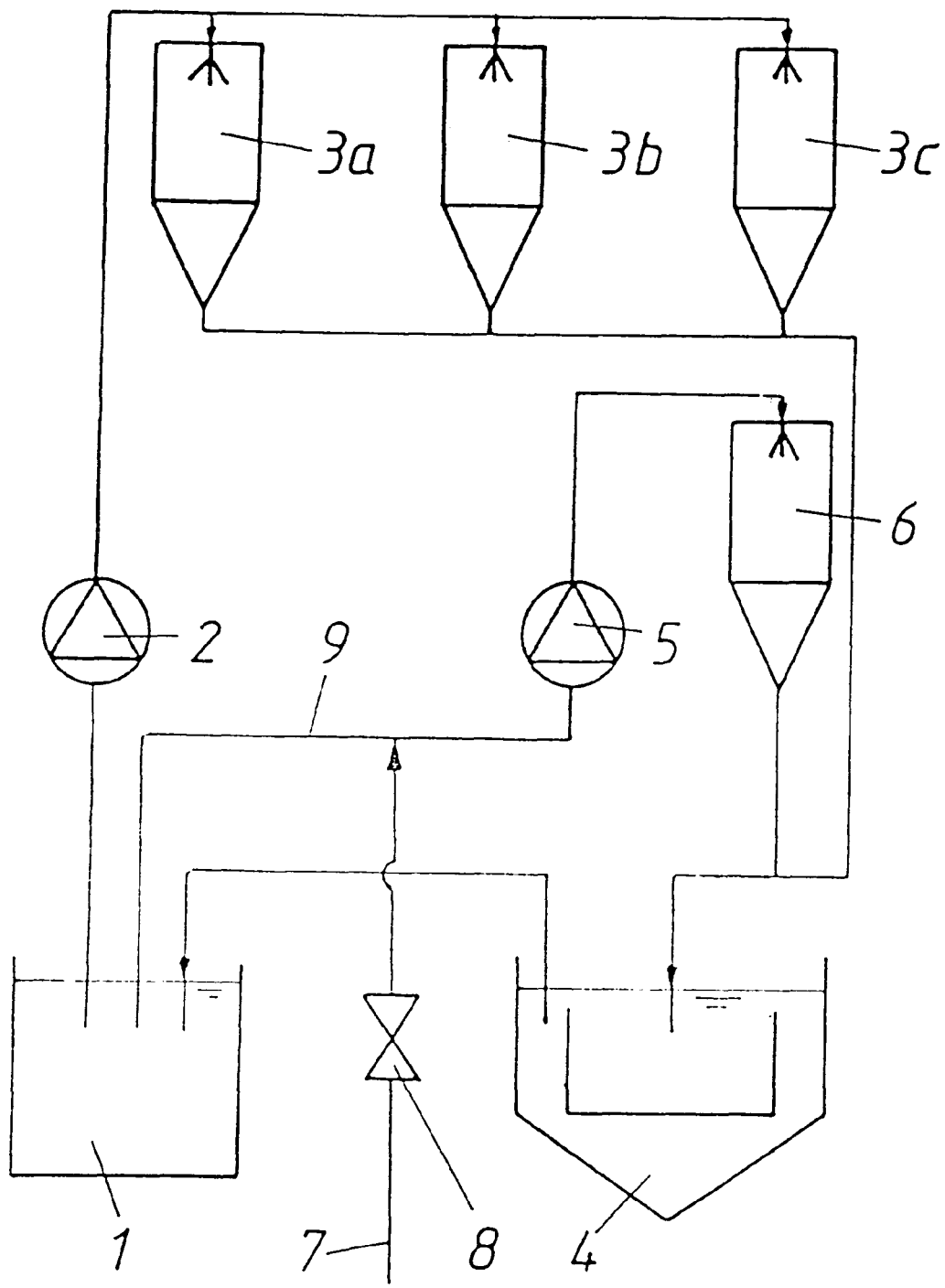
FIG. 1 shows a wash-water cycle with a scrubber battery.

FIG. 1 shows a wash-water cycle where the wash water is pumped from storage tank 1 by means of pump 2 into scrubbers 3a, 3b and 3c, with the wash water flowing in parallel through the scrubbers and the scrubbers being designed as a column.

In this stage, the process gas is separated from the major part of the powdered portions and water-soluble alkali and alkaline-earth compounds through the close contact with the scrubbing liquid. The water-insoluble components of the wash water settle by gravity in settling basin 4. The overflowing wash water, which is liberated from solid products, is drawn off and recirculated to the wash water of wash-water basin 1.

The wash water required for secondary scrubbing in secondary scrubber 6 is withdrawn from wash-water basin 1 by means of conveying line 9, mixed with approx. double the amount of fresh water from fresh-water line 7, controlled by flow controller 8, and pumped into secondary scrubber 6 by means of pump 5. The fresh water from fresh-water line 7 serves to control the wash-water volume of the wash-water cycle and to feed water of a higher solution potential to secondary scrubber 6. This allows to adhere to the purity criteria required for the use of top gas as generator gas arid, thus, for the utilization of the energy content.

Figure 2:
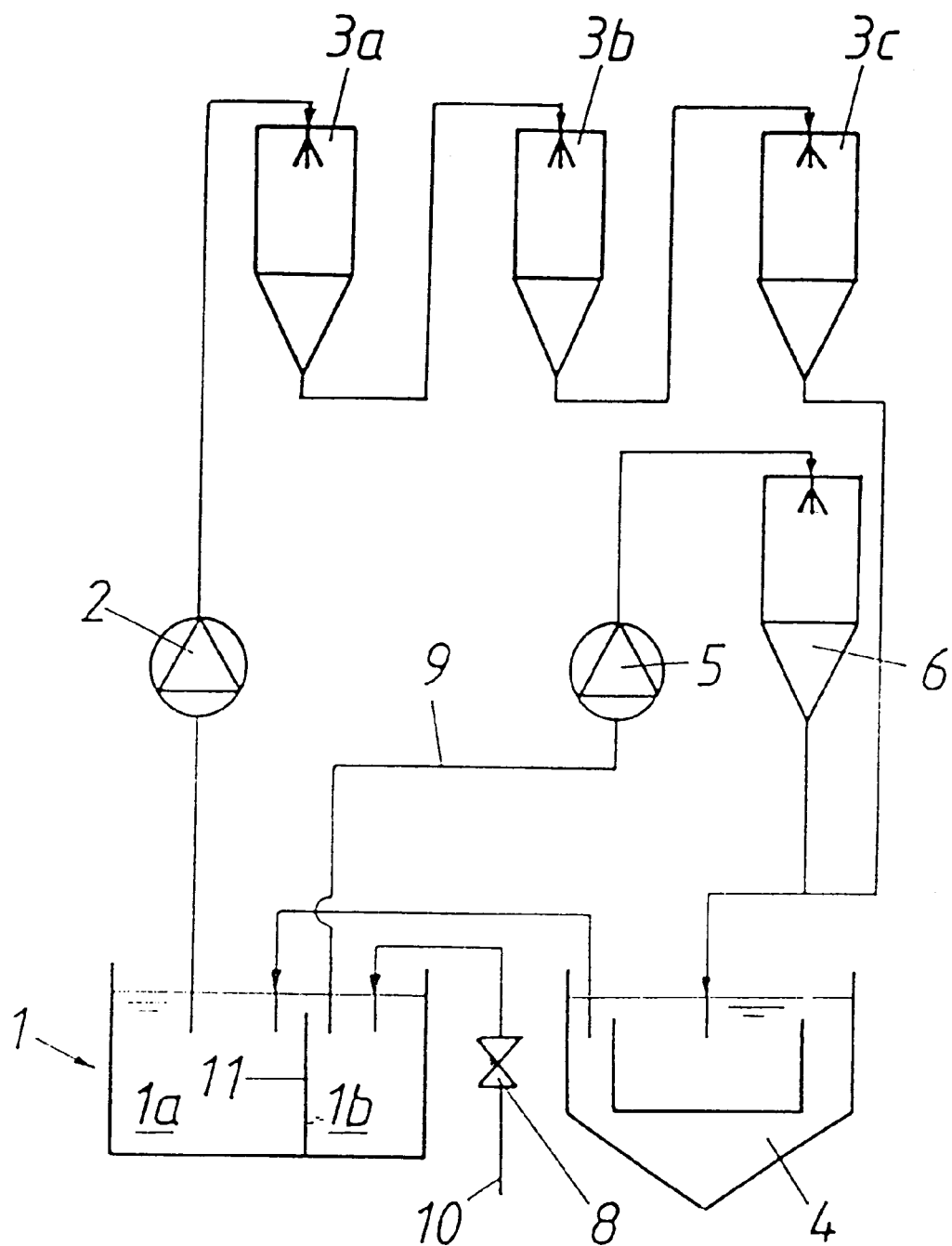
FIG. 2 shows a wash-water cycle with a scrubber cascade.

FIG. 2 shows a wash-water cycle where wash-water basin 1 is divided into chambers 1a and 1b and primary wash water from chamber 1a is first pumped into scrubber 3a by means of pump 2. The wash water withdrawn from the bottom of scrubber 3a after close contact with the top gas is conveyed into the head of scrubber 3b and is brought into close contact with the top gas in this scrubber as well and is then conveyed into scrubber 3c. Downstream of scrubber 3c, the wash water is conveyed into settling basin 4 in order to be treated. After the major part of the freight of constituents has been separated, the wash water is conveyed into chamber 1a of the wash-water basin. In overflow 11 of wash-water basin 1, excess wash water flows from chamber 1a into chamber 1b, where it is mixed with fresh water from fresh-water line 10, controlled by means of controller 8. Owing to this design, where a partial flow of the wash water flows through overflow 11 and where fresh water is charged into this second chamber 1b of wash-water basin 1, the desired wash-water volume can be observed without expensive control. In conveying line 9, this mixture is pumped as feed into secondary scrubber 6 by means of pump 5. In this secondary scrubber, the entrainment of alkali and alkaline-earth compounds into the generator gas is kept within the desired tolerances through the close contact of the process gas with the aerosols of the wash water. After sedimentation and decanting in settling basin 4, this wash water is fed to the major part of the wash water in wash-water basin 1, so the cycle is closed.

What is claimed is:

1. A process for the treatment of wash water during scrubbing of process gases from metallurgical processes, the process comprising scrubbing process gas from a metallurgical furnace with wash water, then separating solids from the wash water, then recirculating the wash water for scrubbing the process gas;

drawing off a partial flow of the recirculated wash water, mixing fresh water with the drawn off water and then performing a secondary scrubbing of the process gas with the mixture of drawn off water and fresh water.

2. The process of claim 1, wherein the fresh water is mixed with the drawn off partial flow of wash-water in the mixing ratio in the range of 2:1 to 4:1.

3. The process of claim 1, wherein the fresh water is mixed with the drawn off partial flow of wash water in the mixing ratio of approximately 3:1.

4. The process of claim 1, wherein the process gas is scrubbed with wash water in a first scrubber, and the secondary scrubbing of the process gas is in a second scrubber.

5. Apparatus f or treating wash water from a gas scrubber used for metallurgical processes, the apparatus comprising several first scrubbing stages for process gas, and a second scrubbing stage for the process gas;

a wash water basin for circulating wash water, a first conveying line connected with the wash water basin for conveying wash water to the first scrubbing stages;

a settling basin connected with the first scrubbing stages for receiving wash water therefrom for separation of washed out solids from wash water that has been mixed with the process gas;

an additional conveying line for conveying a partial flow of wash water, the additional conveying line being located between the wash water basin and the second scrubbing stage, and a fresh water supply line leading into the second scrubbing stage, whereby the second scrubbing stage receives wash water and fresh water which are mixed in the second scrubbing stage.

6. The apparatus of claim 4, further comprising a flow controller provided in the fresh water supply line.

7. The apparatus of claim 4, comprising a further fresh water supply line leading into the wash water basin.

8. The apparatus of claim 5, wherein the wash water basin has first and second chambers, and the first chamber being connected with the first conveying line;

the additional conveying line being connected between the second chamber and the second scrubbing stage.

9. The apparatus of claim 6, further comprising a second flow controller provided in the second fresh water supply line.

10. Apparatus according to claim 4, wherein the wash-water basin is comprised of first and second chambers which are separated by an overflow, with a fresh-water supply line leading into the second chamber and the additional conveying line being corrected between the second chamber and the second scrubbing stage.

* * * * *